United States Patent
Cornic et al.

(10) Patent No.: US 10,585,183 B2
(45) Date of Patent: Mar. 10, 2020

(54) METHOD FOR MEASURING THE HEIGHT OF A TARGET RELATIVE TO THE GROUND USING A MOVING RADAR, AND RADAR IMPLEMENTING SUCH A METHOD

(71) Applicant: THALES, Courbevoie (FR)

(72) Inventors: Pascal Cornic, Guilers (FR); Yves Audic, Plouzane (FR); Stéphane Kemkemian, Paris (FR)

(73) Assignee: THALES, Courbevoie (FR)

( * ) Notice: Subject to any disclaimer, the term of this patent is extended or adjusted under 35 U.S.C. 154(b) by 321 days.

(21) Appl. No.: 15/649,374

(22) Filed: Jul. 13, 2017

(65) Prior Publication Data

US 2018/0038950 A1     Feb. 8, 2018

(30) Foreign Application Priority Data

Aug. 2, 2016   (FR) ..................................... 16 01191

(51) Int. Cl.
| | |
|---|---|
| *G01S 13/60* | (2006.01) |
| *G01S 13/46* | (2006.01) |
| *G01S 13/93* | (2020.01) |
| *G01S 13/931* | (2020.01) |
| *G01S 13/00* | (2006.01) |

(52) U.S. Cl.
CPC ............ *G01S 13/60* (2013.01); *G01S 13/46* (2013.01); *G01S 13/931* (2013.01); *G01S 2013/462* (2013.01); *G01S 2013/9375* (2013.01)

(58) Field of Classification Search
USPC .......................................................... 342/123
See application file for complete search history.

(56) References Cited

U.S. PATENT DOCUMENTS

| | | | | |
|---|---|---|---|---|
| 4,595,925 A | * | 6/1986 | Hansen .................... | G01S 13/46 |
| | | | | 342/120 |
| 5,189,424 A | * | 2/1993 | Brown ..................... | G01S 13/87 |
| | | | | 342/25 C |
| 5,448,241 A | * | 9/1995 | Zeoli ....................... | G01S 13/90 |
| | | | | 342/25 A |
| 5,703,594 A | * | 12/1997 | Anderson ............. | G01C 13/004 |
| | | | | 342/123 |
| 6,266,005 B1 | * | 7/2001 | Schneider ............. | G01S 13/931 |
| | | | | 342/118 |
| 6,377,205 B1 | | 4/2002 | Eckersten et al. | |
| 6,697,012 B2 | * | 2/2004 | Lodwig ................. | G01S 13/003 |
| | | | | 342/118 |

(Continued)

FOREIGN PATENT DOCUMENTS

| | | |
|---|---|---|
| DE | 10 2010 007415 A1 | 9/2010 |
| FR | 2 913 774 A1 | 9/2008 |
| WO | 2007/131923 A1 | 11/2007 |

*Primary Examiner* — Bernarr E Gregory
(74) *Attorney, Agent, or Firm* — Baker & Hostetler LLP

(57) ABSTRACT

Radar equipped with a transmission antenna array and with a reception antenna array is provided, the measurement of the height $h_2$ is obtained by estimating the frequency of at least one time-dependent amplitude modulation produced on the reception antenna array, the modulation generated by the interference of the signals received directly from the target and the signals received after reflection on the ground, on the basis of the signals transmitted by the transmission antenna array.

20 Claims, 9 Drawing Sheets

(56) References Cited

U.S. PATENT DOCUMENTS

| | | | | |
|---|---|---|---|---|
| 7,265,710 B2* | 9/2007 | DeAgro | ................. | G01S 13/46 |
| | | | | 342/120 |
| 7,808,426 B1* | 10/2010 | Smith, Jr. | ............. | G01S 13/003 |
| | | | | 342/123 |
| 7,830,302 B1* | 11/2010 | Smith, Jr. | ............. | G01S 13/003 |
| | | | | 342/123 |
| 8,149,158 B2* | 4/2012 | Samukawa | ........... | G01S 13/931 |
| | | | | 342/105 |
| 8,659,470 B2* | 2/2014 | Driessen | ............ | G01S 13/4418 |
| | | | | 342/123 |
| 9,140,788 B2* | 9/2015 | Kuehnle | ............... | G01S 13/931 |
| 2008/0111733 A1 | 5/2008 | Spyropulos et al. | | |
| 2011/0221628 A1* | 9/2011 | Kamo | .................. | G01S 13/931 |
| | | | | 342/70 |
| 2013/0082868 A1* | 4/2013 | Ohkado | ................ | G01S 13/931 |
| | | | | 342/70 |

* cited by examiner

METHOD FOR MEASURING THE HEIGHT OF A TARGET RELATIVE TO THE GROUND USING A MOVING RADAR, AND RADAR IMPLEMENTING SUCH A METHOD

CROSS-REFERENCE TO RELATED APPLICATIONS

This application claims priority to foreign French patent application No. FR 1601191, filed on Aug. 2, 2016, the disclosure of which is incorporated by reference in its entirety.

FIELD OF THE INVENTION

The present invention relates to a method for measuring the height of a target relative to the ground using a moving radar, in particular using a radar fitted on a motor vehicle. It also relates to a radar implementing such a method.

The invention applies in particular to the field of radars for motor vehicles, for example for detecting heights of bridge decks.

BACKGROUND

Radars for motor vehicles were introduced for more comfort-oriented driving assistance functions, such as for example the ACC (Adaptive Cruise Control) function for use on motorways, or 'Stop and Go' in urban driving conditions. They use millimetric waves, in particular the 76-81 GHz band.

On account of technological developments, present applications also target collision avoidance safety functions, and there is even a view to, in the relatively short term, achieving a completely autonomous vehicle, with the perception of surroundings being ensured through the combination of a certain number of sensors based on various technologies, in particular radar, video and infrared.

Due to its all-weather capabilities, radar remains an important sensor in this context, and its detection and discrimination capabilities must be broadened in order to guarantee the overall reliability of the system. With regard to collision avoidance, the radar sensor must in particular be capable of distinguishing between the fixed objects that it detects, those corresponding to highway infrastructure elements and those corresponding to stationary vehicles on the road that potentially constitute a collision risk. In this context, it is vital in particular that it does not generate false alarms, which may lead to a braking operation or an emergency avoidance manoeuvre, without an actual cause, in particular when the vehicle is moving at high speed. This requires enhanced sensitivity and discrimination capabilities that make it possible to assess the situation a long distance, typically greater than 200 m, ahead of the vehicle, with in particular the capability of estimating the height of the detected objects in order to differentiate between them.

One particularly tricky configuration is that for detecting bridge decks ahead of vehicles, which bridge decks must not be confused with stationary vehicles on traffic routes. Moreover, in order to allow integration in vehicles, the dimensions of the radar antenna must typically be smaller than 10 cm horizontally by 10 cm vertically. This condition limits the angular resolution from the outset to a value of the order of 2.5° for a radar operating at 76 GHz, which is not sufficient for estimating the height of fixed objects at long distance.

One technical problem to be solved is that of obtaining discrimination capabilities for elevation that are sufficient for processing complex situations, such as detecting bridges at long distance, in spite of the small dimensions of the antenna.

This problem is not currently solved. Some solutions involve providing new-generation radars with at least two reception channels in the vertical plane, for the purpose of obtaining a capability of measuring the height of the detected objects through an angular deviation processing operation. However, this technique does not exhibit discrimination that is sufficient to estimate the height of the obstacles at long distance, due to the constrictive dimensions of the antenna. Moreover, it is not very well suited to measuring the height of objects extending in the vertical plane, and the measurement may be disturbed by reflections on the ground. Adaptive high-resolution processing operations may be implemented to improve the natural separating power of the antenna, but these processing operations are not effective in the presence of reflections on the ground, on account of the coherence of the direct and reflected signals.

SUMMARY OF THE INVENTION

One aim of the invention is in particular to solve the abovementioned problem. To this end, one subject of the invention is a method for measuring the height of a target relative to the ground using a moving radar transmitting a detection signal towards said target, said radar being equipped with a transmission antenna array and with a reception antenna array, the measurement of said height $h_2$ being obtained by estimating the frequency of at least one time-dependent amplitude modulation produced on said reception antenna array, said modulation being generated by the interference of the signals received directly from said target and the signals received after reflection on the ground, on the basis of the signals transmitted by said transmission antenna array.

The measurement of said target height $h_2$ is obtained, for example, for a given time-dependent modulation, by applying the following equation:

$$h_2 = \frac{\lambda d_0^2 \hat{f}}{h_1 V}$$

$h_2$ being said estimated height;
$\hat{f}$ being the estimated frequency of said time-dependent amplitude modulation;
$h_1$ being said same height;
$d_0$ being the distance from said radar to the target;
$V$ being the closing speed of said radar towards the target;
$\lambda$ being the wavelength of said radar.

In one possible mode of implementation, said reception antenna array being formed of one or more reception sub-arrays and said transmission antenna array being formed of one or more transmission sub-arrays, each signal transmitted by a transmission sub-array generating a time-dependent amplitude modulation on each reception sub-array, a measurement of said target height $h_2$ is carried out by estimating the frequency of the time-dependent amplitude modulation produced on a reception sub-array by a transmission sub-array situated at the same height.

The estimation ($\hat{f}$) of the modulation frequency is for example carried out using a suitable two-dimensional correlation function, taking account of the frequency and the phase at the origin of said modulation, the estimation of the frequency being equal to the frequency $f_k$ of the frequency-phase pair ($f_k$, $\varphi_k$) giving the correlation maximum.

In one possible mode of implementation, said reception antenna array being formed of one or more reception sub-arrays and said transmission antenna array being formed of one or more transmission sub-arrays, each signal transmitted by a transmission sub-array generating a time-dependent amplitude modulation on each reception sub-array, a measurement of said target height $h_2$ is carried out by estimating the frequency of the time-dependent amplitude modulation produced on a reception sub-array by a transmission sub-array situated at a different height, said modulation being the product of a modulation corresponding to the outbound path and a modulation corresponding to the return path of the wave transmitted by said transmission sub-array, a measurement of said height being the estimation $\hat{f}_e$ of the modulation frequency due to the outbound path or the estimation $\hat{f}_r$ of the modulation frequency due to the return path. Said measurement is for example taken to be equal to a combination of the estimation $\hat{f}_e$ of the modulation frequency due to the outbound path and of the estimation $\hat{f}_r$ of the modulation frequency due to the return path; this combination averages the two estimations $\hat{f}_e$ and $\hat{f}_r$, for example.

The estimation of said modulation frequencies, due to the outbound path and to the return path, is for example carried out using a correlation function taking account of the modulation frequency due to the outbound path and the modulation frequency due to the return path, said estimated frequencies $\hat{f}_e$, $\hat{f}_r$ being those giving the correlation maximum.

Said frequency estimation with which said height measurement is for example obtained is a combination of the time-dependent amplitude modulation frequency estimations obtained for various pairs of transmission and reception sub-arrays.

In one possible mode of implementation, said reception antenna array including a plurality of reception sub-arrays, each reception sub-array receiving at least one interference signal originating from a signal transmitted by said transmission antenna array, said interference signal being subjected to time-dependent amplitude modulation:
 the trend of at least one spatial amplitude modulation produced on said reception antenna array at a given instant is captured;
 an estimation $\hat{f}$ of the time-dependent amplitude modulation frequency is calculated by means of a spatio-temporal correlation function taking account of the time-dependent amplitude modulation frequency and the frequency of said at least one spatial amplitude modulation, the frequency $f_k$ corresponding to the correlation maximum of said spatio-temporal correlation being the estimated frequency $\hat{f}$, the measurement of said target height being calculated on the basis of this estimated frequency.

In one possible mode of implementation, said transmission antenna array including a plurality of transmission sub-arrays, the trend of the spatial amplitude modulation produced on said reception antenna array corresponding to each signal transmitted by a transmission sub-array is captured, an estimation $\hat{f}$ of the time-dependent amplitude modulation frequency is calculated for each transmitted signal by means of a spatio-temporal correlation function taking account of the time-dependent amplitude modulation frequency and the frequency of said at least one spatial amplitude modulation, the frequency $f_k$ corresponding to the correlation maximum of said spatio-temporal correlation being the estimated frequency $\hat{f}$ of the time-dependent amplitude modulation generated by said transmitted signal, a measurement of said target height ($h_2$) being calculated on the basis of at least one estimated frequency corresponding to a signal transmitted from said transmission sub-arrays. The measurement of said target height $h_2$ is for example a combination of the height measurements corresponding to each transmitted signal, this combination being an average, for example.

Another subject of the invention is a radar able to implement a method such as described previously, such a radar advantageously being able to be fitted on a motor vehicle.

BRIEF DESCRIPTION OF THE DRAWINGS

Other features and advantages of the invention will become apparent with the aid of the following description, given with reference to the appended drawings, in which.

DETAILED DESCRIPTION

Figure 1:
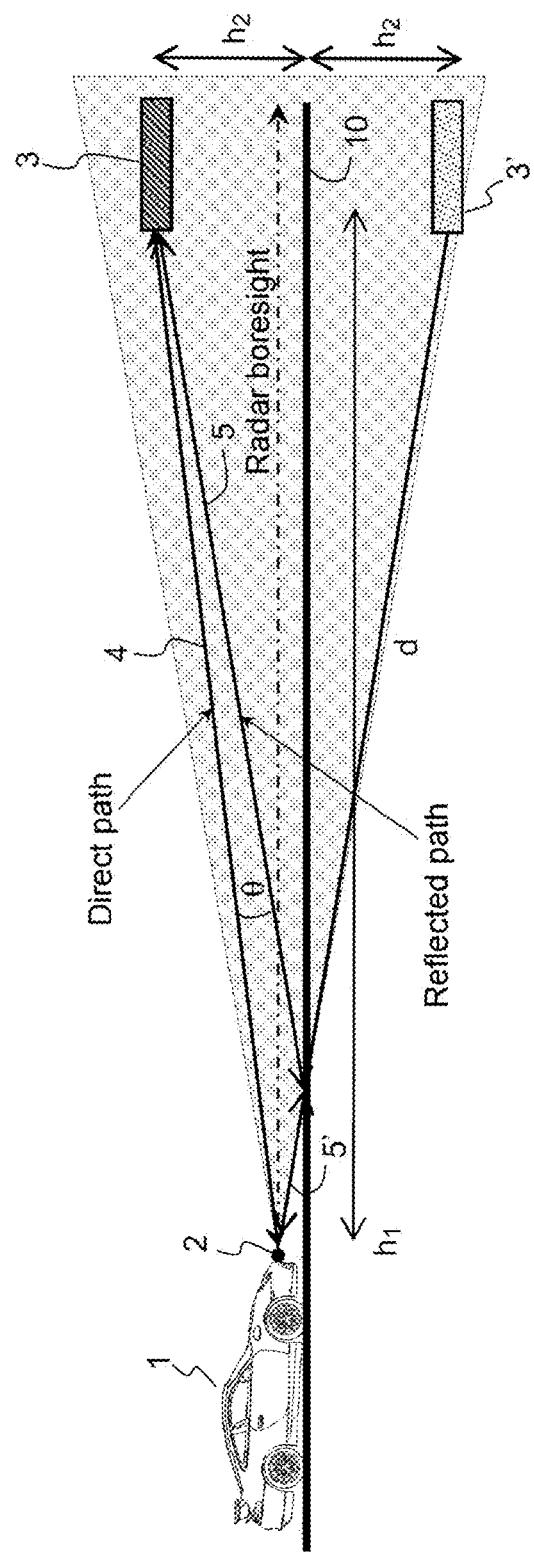
FIG. 1 shows an illustration of a vehicle equipped with a radar directed towards a bridge whose height is to be estimated.

FIG. 1 shows a vehicle 1, equipped with a radar 2, directed towards a bridge whose deck 3 is shown. A motor vehicle radar 2 mounted on a vehicle and whose beam is oriented towards the front of said vehicle is under consideration in a general manner.

On a passenger vehicle, this radar is generally installed on the radiator grille, behind the logo of the brand, at a height $h_1$ of the order of 40 centimetres relative to the roadway. A fixed object, captured by the beam of the radar and situated at a height $h_2$ relative to the road, generates a composite signal at the radar through reflection, resulting from the direct path 4 and from the reflected path 5, 5' of the electromagnetic wave on the ground. This applies for the outbound path and for the return path. This results in a modulation of the amplitude of the signal received on the radar antenna depending on the distance from the target d, on the height of the radar $h_1$ and on the height of the target $h_2$.

This phenomenon is well known to those skilled in the art. It is described, for example, by Daricau (Chapter 11, paragraph 3.1).

FIG. 1 gives an illustration thereof applied to the motor vehicle radar, in the case of an object isolated from the ground, such as the bridge deck 3. The image 3' of the bridge is also shown, and this image, symmetrical about the surface 10 of the roadway, fictitiously returns the ray 5' reflected by the roadway and received by the radar.

Another configuration is possible, corresponding to a vertical continuous structure located on the ground, such as for example a vehicle, a signpost or a bridge pier. In this case, it is the position of the barycentre of the bright spots or the position of the average radar equivalent surface (RES) that determines the apparent height of the object. The invention also applies for these configurations, and then yields the apparent height of the object, rather than the actual height.

Thus, for a radar transmitter and receiver both situated at the height $h_1$, the outbound/return coefficient of modulation may be written as:

$$I^2(\Theta) = \left(1 + \rho^2 + 2\rho\cos\left(\frac{4\pi h_1 \sin(\Theta)}{\lambda} + \varphi\right)\right)^2 \quad (A)$$

where:
- $\theta$ is the angle of elevation of the target relative to the ground at the base of the radar;
- $\lambda$ is the wavelength;
- $\rho$ is the amplitude of the coefficient of reflection;
- $\varphi$ is the phase of the coefficient of reflection, that is to say the phase shift induced by the reflection.

By denoting $h_2$ as the apparent height and d as the distance from the target object, for small angles, we also obtain:

$$\sin(\Theta) = \frac{h_2}{d}$$

For small angles $\theta$, for example $\theta<5°$, those that are of interest for the invention, $$\Theta = \frac{h_2}{d}.$$

In this case, equation (A) becomes:

$$I^2(\Theta) = \left(1 + \rho^2 + 2\rho\cos\left(\frac{4\pi h_1 h_2}{\lambda d} + \varphi\right)\right)^2 \quad (A')$$

For such angles, the amplitude of the coefficient of reflection $\rho$ on a roadway is between 0.7 and 1, and its phase $\varphi$ is close to $\pi$, thereby resulting in the following new equation:

$$I^2(\Theta) = \left(1 + \rho^2 - 2\rho\cos\left(\frac{4\pi h_1 h_2}{\lambda d}\right)\right)^2 \quad (1)$$

For the specific case where $\rho=1$, we obtain:

$$I^2(\Theta) = 16\sin^4\left(\frac{2\pi h_1 h_2}{\lambda d}\right) \quad (2)$$

Figure 2:
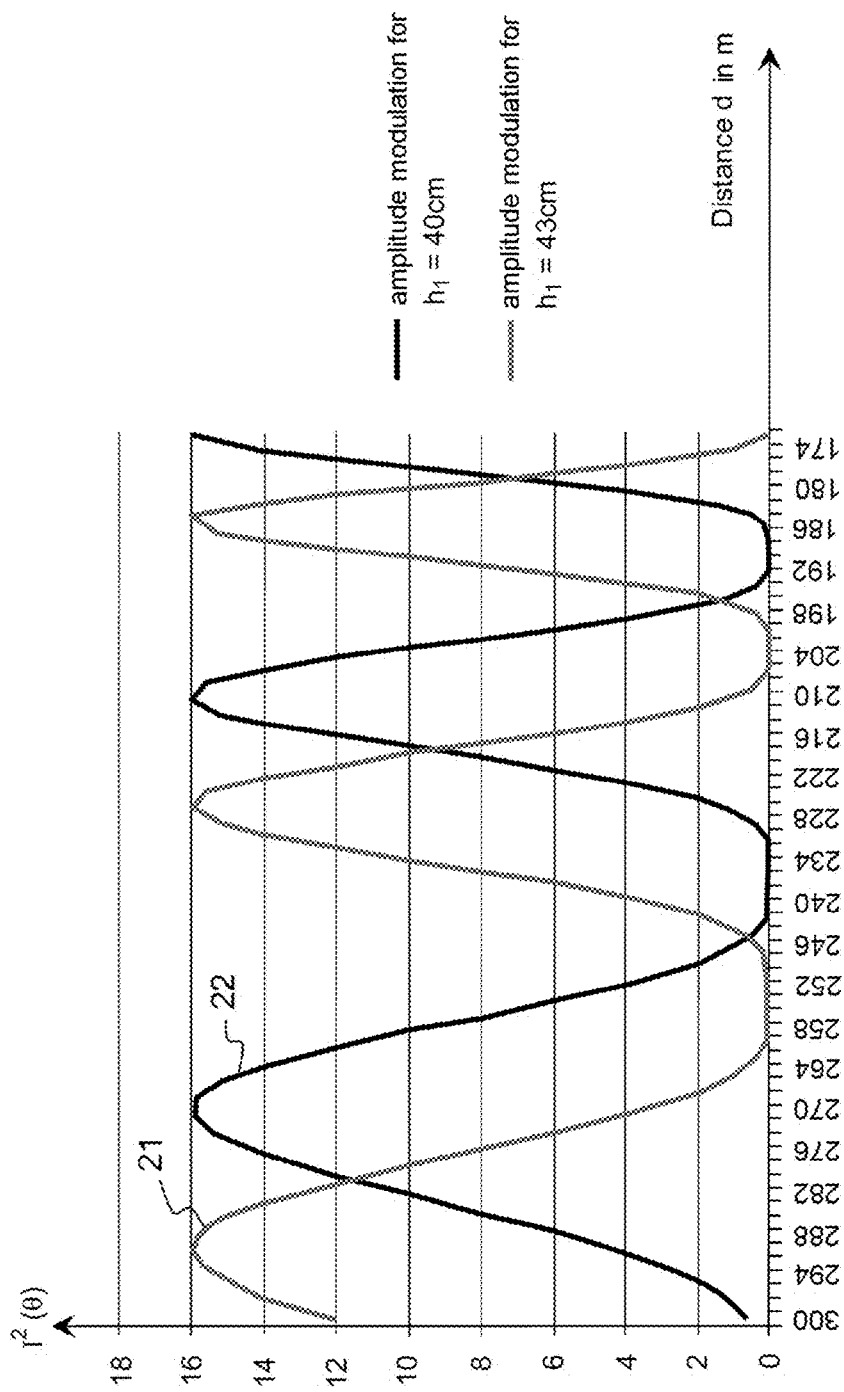
FIG. 2 shows the theoretical amplitude modulation of the received signal depending on the distance d from the radar to the upcoming obstacle.

FIG. 2 shows, for $\rho=1$, the theoretical amplitude modulation $I^2(\theta)$ of the received signal depending on the distance d from the radar to the obstacle, for a radar antenna formed of a first sub-array at the height $h_1$ and of a second sub-array at a different height $h_1$, for an obstacle height $h_2$ equal to 4.6 m. The transmission and the reception take place at the same height. A first curve 21 shows the amplitude modulation for the height $h_1=40$ cm and a second curve 22 shows the amplitude modulation for the height $h_1=43$ cm.

If the coefficient of reflection $\rho$ is not equal to 1 but is close to 1, however, $1+\rho^2$ is practically equal to $2\rho$. Equation (1) thus becomes:

$$I^2(\Theta) = 4\rho^2\left(1 - \cos\left(\frac{4\pi h_1 h_2}{\lambda d}\right)\right)^2$$

and finally:

$$I^2(\Theta) = 16\rho^2\sin^4\left(\frac{2\pi h_1 h_2}{\lambda d}\right) \quad (3)$$

In this case, we see a modulation with a form identical to the previous one, defined by equation (2), to within $\rho^2$, that is to say having a shallower depth.

If the transmission antenna (or antenna sub-array) and the reception antenna (or antenna sub-array) are positioned at two different heights, respectively $h_{1e}$ and $h_{1r}$ (more precisely $h_{1e}$ and $h_{1r}$, corresponding respectively to the height of the phase centre on transmission and of the phase centre on reception), the amplitude modulation is different on transmission ($I_e(\theta)$) and on reception ($Ir(\theta)$), and may be written as follows for the outbound/return path:

$$I_e(\Theta)Ir(\Theta) = 16\rho^2\sin^2\left(\frac{2\pi h_{1e} h_2}{\lambda d}\right)\sin^2\left(\frac{2\pi h_{1r} h_2}{\lambda d}\right) \quad (4)$$

The method according to the invention proposes estimating the height of the target $h_2$ on the basis of the amplitude modulation $I^2(\theta)$ or $I_e(\theta)Ir(\theta)$ as the case may be, the heights $h_{1e}$, $h_{1r}$ being known, and the wavelength $\lambda$ also being known. The distance d is moreover measured by the radar. When the heights of the phase centres are identical on transmission and on reception, it is noted that $h_1=h_{1e}, h_{1r}$.

According to the invention, the estimation is carried out using a dynamic measurement, more precisely by measuring one or more amplitude modulations on the antenna over time, on a reception antenna or a plurality of reception antenna sub-arrays, for a single transmission antenna position or for a plurality of transmission antenna sub-array positions positioned at different heights.

A first mode of implementation of the invention, utilizing a dynamic measurement of the time-dependent modulation function, will now be described.

Figure 3:
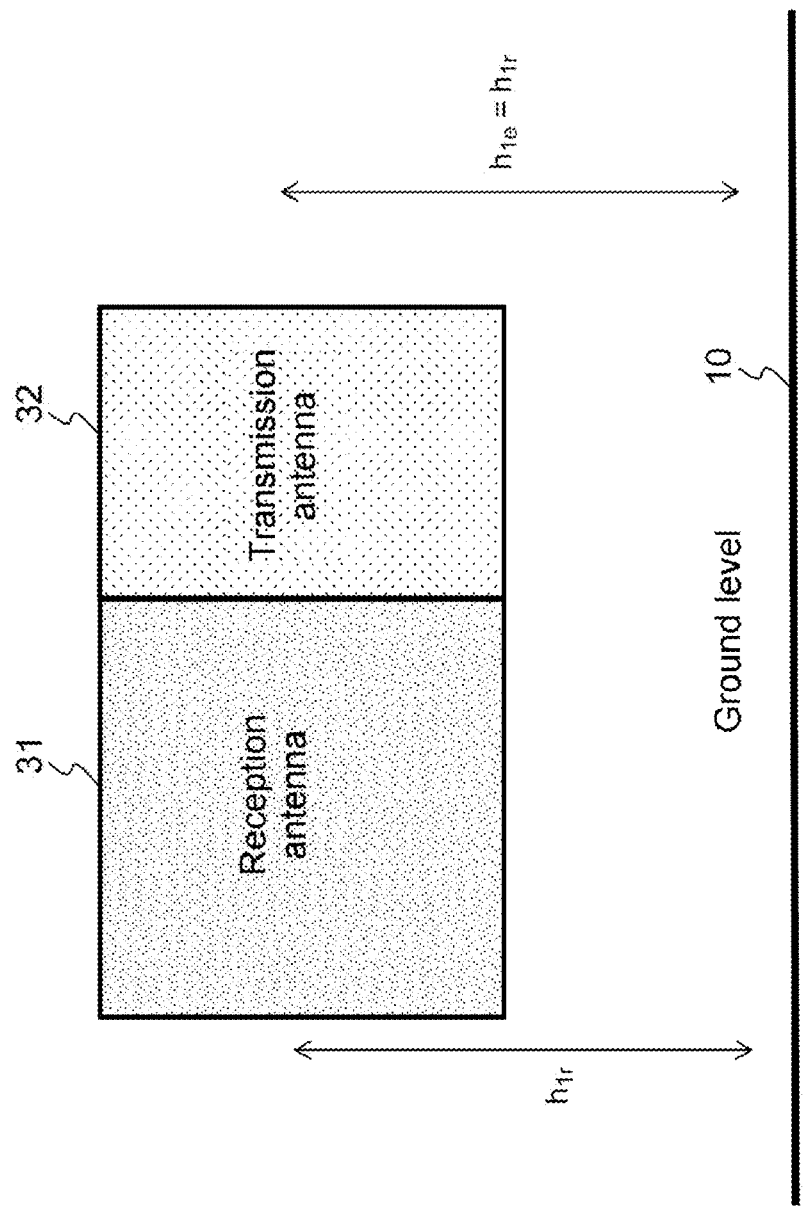
FIG. 3 shows, in a front view, a reception antenna and a transmission antenna that are positioned at one and the same height $h_1$ relative to the ground.

FIG. 3 shows, in a front view, a reception antenna 31 and a transmission antenna 32 that are positioned at one and the same height h1 relative to the ground. In this configuration, the transmission and reception antennas may include a plurality of sub-arrays, provided that the phase centres of the transmission and reception sub-array pairs are at the same height relative to the ground.

At an instant t corresponding to the end of a radar detection cycle of duration $\Delta T$ of rank i, such that $t=i\Delta T$, the signal received by the radar from a target situated at a distance $d_i$ and at the height $h_2$ is proportional to:

$$I^2(\Theta_i) = \left(1 + \rho^2 - 2\rho\cos\left(\frac{4\pi h_1 h_2}{\lambda d_i}\right)\right)^2$$

as defined in equation (1) and for low values of $\theta_i$.

The received signal is also proportional to:

$$I^2(\Theta_i) = 16\rho^2 \sin^4\left(\frac{2\pi h_1 h_2}{\lambda d_i}\right)$$

for coefficients of reflection $\rho$ close to 1, and where $$\Theta_i = \frac{h_2}{d_i},$$

$d_i$ being the distance from the detected target at $t=i\Delta t$.

Moreover, starting from an initial detection distance $d_0$, the detection distance at the instant $t=i\Delta T$ may be written as:

$$d_i = d_0 - Vi\Delta T,$$

where V is the closing speed of the vehicle relative to the target.

If the detection distance $d_i$ is long with respect to the movement performed between two successive detections, we may write:

$$\frac{1}{d_i} = \frac{1}{d_0 - Vi\Delta T} \approx \frac{1}{d_0}\left(1 + \frac{Vi\Delta T}{d_0}\right),$$

corresponding, by multiplication by $h_2$, to:

$$\Theta_i = \Theta_0\left(1 + \frac{Vi\Delta T}{d_0}\right)$$

and consequently:

$$I^2(\Theta_i) = \left(1 + \rho^2 - 2\rho\cos\left(\frac{4\pi h_1 h_2}{\lambda d_0}\left(1 + \frac{Vi\Delta T}{d_0}\right)\right)\right)^2 \text{ Or}$$

$$I^2(\Theta_i) = 16\rho^2 \sin^4\left(\frac{2\pi h_1 h_2}{\lambda d_0}\left(1 + \frac{Vi\Delta T}{d_0}\right)\right)$$

if $\rho$ is close to 1.

This last equation may also be written as:

$$I^2(\theta_i) = 16\rho^2 \sin^4(2\pi f i\Delta T + \varphi_0) \qquad (5)$$

where f represents the modulation frequency of the interference fringes in the time domain:

$$f = \frac{h_1 h_2 V}{\lambda d_0^2}$$

and $\varphi_0$ represents the phase at the origin of the modulation function:

$$\varphi_0 = \frac{2\pi h_1 h_2}{\lambda d_0}$$

which may also be written as:

$$\varphi_0 = \frac{2\pi f d_0}{V}$$

The measurement of the modulation frequency f gives access to an estimation of the height measurement of the target using the equation:

$$h_2 = \frac{\lambda d_0^2 f}{h_1 V},$$

the wavelength $\lambda$, the initial detection distance $d_0$ and the height $h_1$ being known and the speed V moreover being measured by the radar.

To measure the modulation frequency, it is possible for example to calculate the fourth root of the amplitude of the received signal, which is proportional to the modulation function $I^2(\theta_i)$, in order to deduce therefrom, at the instant $t=i\Delta T$, an amplitude function $x_i=K|\sin(2\pi f i\Delta T + \varphi_0)|$, as defined in equation (5).

Figure 4:
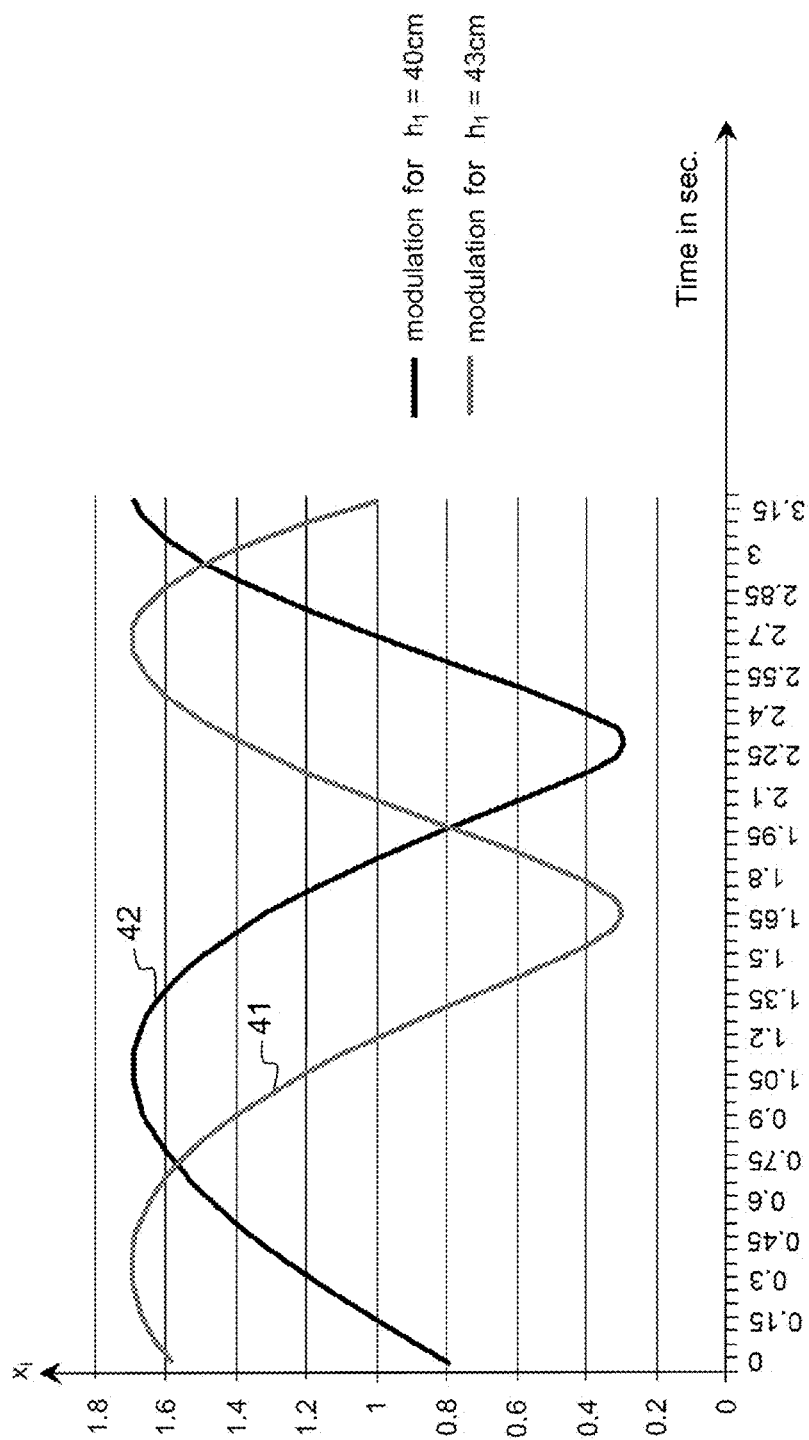
FIG. 4 shows the theoretical trend of the time-dependent modulation function for two different heights of the reception sub-array of the radar.

FIG. 4 below shows the theoretical trend of the time-dependent modulation function $x_i$ for two different reception sub-array heights, for a target positioned at a height of 4.60 m, an initial detection distance of 300 metres, a coefficient of reflection of $\rho=0.7$ and a closing speed of 100 km/h.

Each sub-array receives a signal whose amplitude varies with a time-dependent frequency $f(i\Delta T)$ and that is dependent on the height to be calculated and on the distance. A first curve 41 shows the temporal modulation received by the sub-array at the height $h_1$ and a second curve 42 shows the temporal modulation received by the sub-array at the height $h_2$. The horizontal axis shows the time $t=i\Delta T$, the time $t=0$ corresponding to the distance $d_0$ equal to 300 m.

By repeating the operation over a total time $N\Delta T$, that is to say over N radar detection cycles, a series of N samples is obtained that characterize the amplitude modulation over time. These N samples in fact sample the temporal modulation curves 41, 42.

In practice, the height $h_2$ (height to be calculated) is obtained by measuring the amplitude modulation on the antenna over time, the measurements being sampled. Once the modulation law has been obtained by sampling, it is necessary to extract the frequency f that gives the height $h_2$. To this end, a plurality of solutions are possible.

To estimate this frequency f, it is possible for example to use a correlation function by using the method described in the patent application FR 2 913 774, in particular with regard to equations (8) to (11). For example, by discretizing the frequency space into M possible values between 0 and $F_{max}$ such that, for k ranging from 0 to M−1, $$k = \frac{F\max}{M}.$$

The function $x_i$ may be sampled by applying:

$$s_{i,k} = \left|\sin\left(2\pi\frac{ikF\max\Delta T}{M} + 2\pi\frac{kF\max d_0}{MV}\right)\right|$$

or else:

$$s_{i,k} = \left|\sin\left(2\pi i f_k \Delta T + 2\pi\frac{f_k d_0}{V}\right)\right|$$

The following correlation function is then calculated:

$$\text{Correl}_k = \frac{\sum_{i=0}^{N-1} x_i * s_{i,k}}{\sqrt{\sum_{i=0}^{N-1} x_i^2}\sqrt{\sum_{k=0}^{N-1} s_{i,k}^2}}$$

The value of k, for which the function $\text{Correl}_k$ exhibits a maximum, gives an estimation of the modulation frequency $$\hat{f} = f_k = \frac{kF\max}{M}$$

from which we deduce:

$$h_2 = \frac{\lambda d_0^2 \hat{f}}{h_1 V}$$

The number of points N is selected to be as large as possible, within the limit of the validity of the assumption that the total displacement $NV\Delta T$ is much lower than the initial detection distance $d_0$. A single one of the two curves 41, 42 may suffice to extract the frequency. The interference signal generated on the basis of the transmitted signal at the height $h_1=40$ cm produces a modulation 41 whose estimated frequency makes it possible to obtain the height $h_2$, which is itself estimated. Likewise, the interference signal generated on the basis of the transmitted signal at the height $h_1=43$ cm produces a modulation 42 giving a second frequency estimation. However, it is advantageously possible to combine the two estimations in order to improve the measurement, using the average of the two estimated frequencies or using any other combination.

In one variant implementation, another correlation function may be used in order to make the estimation more robust. In particular, it may be noted that the correlator $\text{Correl}_k$ explicitly links the phase at the origin $$\varphi_k = 2\pi\frac{kF\max d_0}{MV}$$

to the frequency $f_k$ using the equation $$\varphi_k = 2\pi\frac{f_k d_0}{V}.$$

Now, the result of the correlation is strongly dependent on this phase $\varphi_k$, which is itself sensitive to an error in the estimation of the height $h_1$, the initial distance $d_0$ and the speed V.

For example, for $h_1=40$ cm, $h_2=4.60$ m, $V=27$ m/sec, $\lambda=3.9$ mm and $d_0=300$ m, we have $f=0.14$ Hz and $\varphi_0=1.57\times 2\times\pi$.

Increasing $h_1$ by 3 cm, giving $h_1=43$ cm, i.e. a variation of less than 10%, results in a new phase value $\varphi_0=1.68\times2\times\pi$, corresponding to a difference of 40° relative to the initial value, while the frequency f is modified only by 0.01 Hz, from 0.14 Hz to 0.15 Hz, which is very small. This effect is visible in FIG. 4, which shows the phase shift at the origin between the two curves corresponding to these two heights.

In order to prevent excessively high sensitivity of the correlator relative to the original phase, it is preferable to select a function $s_{i,k,k'}$, such that:

$$s_{i,k,k'} = \left|\sin\left(2\pi\frac{ikF\max\Delta T}{M} + \varphi_{k'}\right)\right|$$

By discretizing the frequency space into M possible values between 0 and $F_{max}$ such that, for k ranging from 0 to M−1, $$f_k = k\frac{F\max}{M},$$

and by discreditzing the phase space into M' possible values between 0 and $2\pi/M'$ such that, for k ranging from 0 to M−1, $$\varphi_{k'} = k'\frac{2\pi}{M'},$$

the two-dimensional correlation function is then calculated:

$$\text{Correl}_{k,k'} = \frac{\sum_{i=0}^{N-1} x_i * s_{i,k,k'}}{\sqrt{\sum_{i=0}^{N-1} x_i^2}\sqrt{\sum_{k=0}^{N-1} s_{i,k,k'}^2}}$$

The values of k and k' for which the function $\text{Correl}_{k,k'}$ exhibits a maximum give an estimation of the modulation frequency:

$$\hat{f} = f_k = \frac{kF\max}{M}$$

from which we deduce $$h_2 = \frac{\lambda d_0^2 \hat{f}}{h_1 V}$$

The measurement may be repeated as the target becomes closer, so as to improve the quality of the estimation. The measurement may also be carried out on two or more transmitter/receiver pairs whose antenna sub-arrays are situated at the same height relative to the ground, in accordance for example with FIG. 5.

Figure 5:
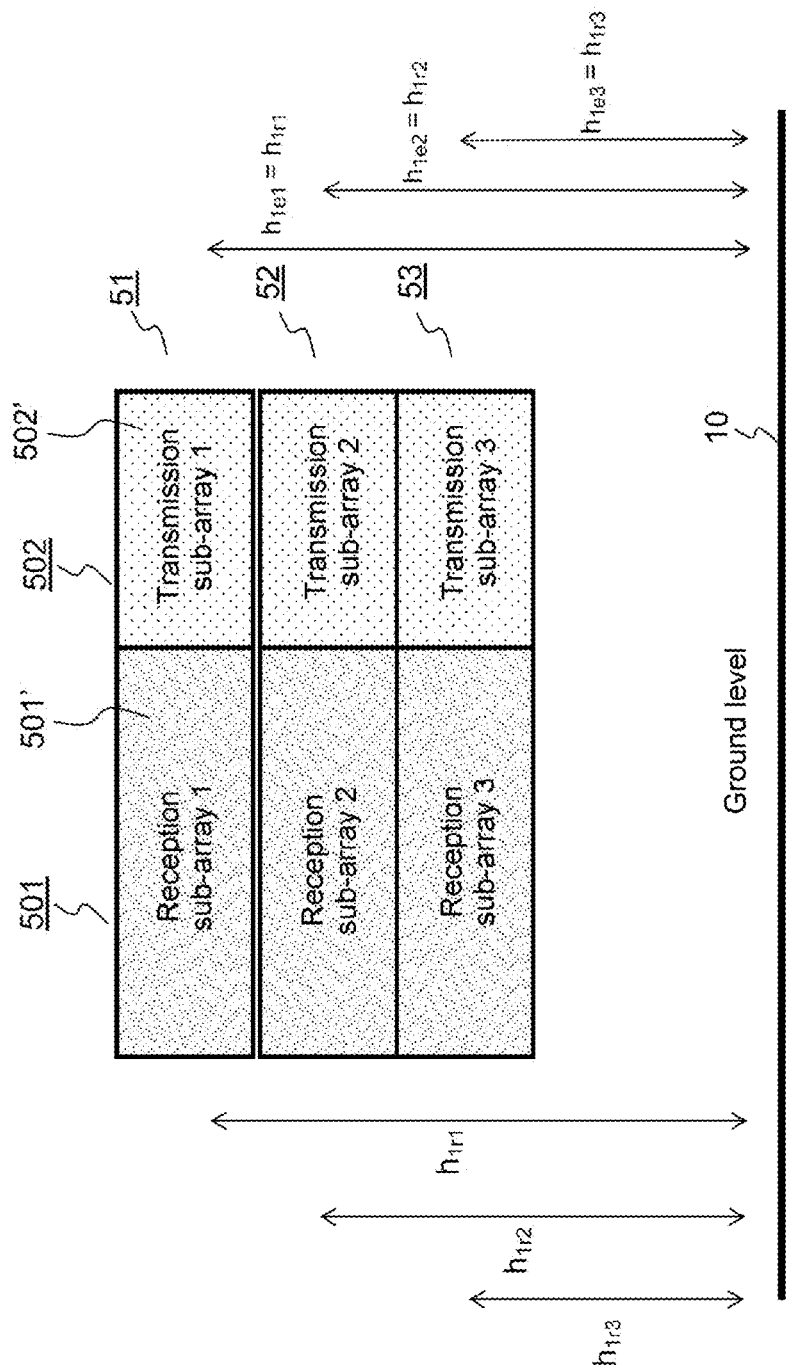
FIG. 5 shows, in a front view, an example of an antenna architecture of a radar according to the invention, with three pairs of transmission and reception sub-arrays extending in the height direction.

FIG. 5 shows an antenna architecture corresponding to an MIMO (Multiple Input, Multiple Output) array. More precisely, it exhibits the radar antenna, seen from the front, with three pairs of transmission and reception sub-arrays 51, 52, 53 extending in the height direction, a transmission sub-array and a reception sub-array of one and the same pair being at the same height. The antenna architecture of FIG. 5 may also be viewed as including a reception antenna array 501 and a transmission antenna array 502. This architecture expands on the example of FIG. 3, in which the antenna arrays are confined to a single sub-array, formed of the reception antenna or of the transmission antenna.

In this configuration, each transmitter/receiver pair of identical height 51, 52, 53 gives an estimation of the measurement of the height $h_2$, and these independently obtained estimations may be averaged in order to refine the measurement, a combination other than the average being possible.

The transmissions on the various antenna sub-arrays may be performed sequentially or simultaneously, on the condition that orthogonal signals are transmitted on the various sub-arrays.

Figure 6:
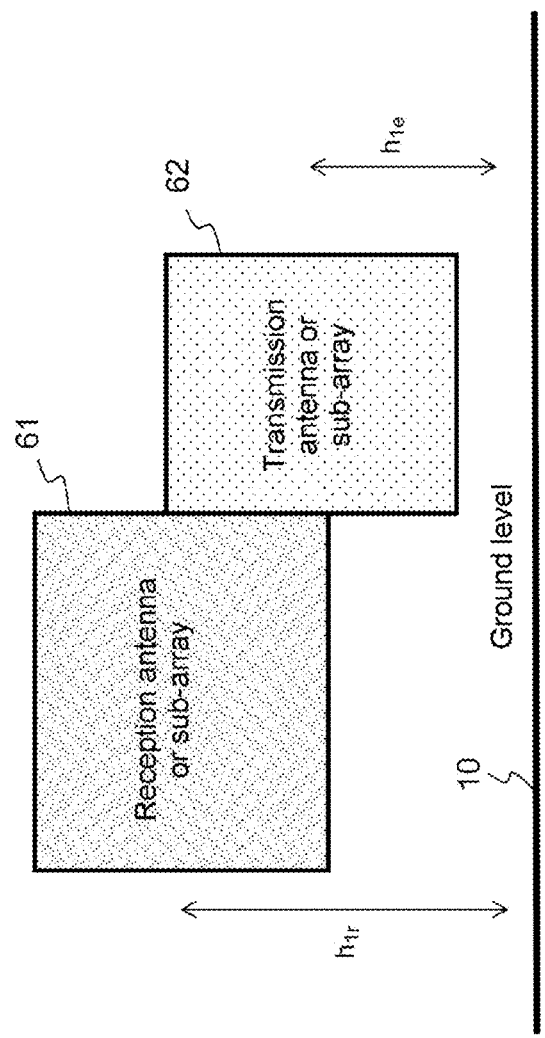
FIG. 6 shows, in a front view, a reception antenna and a transmission antenna that are positioned at different heights relative to the ground.

FIG. 6 exhibits an antenna configuration in which the reception antenna or sub-array 61 is at a height $h_{1r}$ different from the height $h_{1e}$ of the transmission antenna or sub-array 62. In this case, it is also possible to obtain an estimation of the height of the target. The amplitude modulations corresponding to the outbound path and to the return path of the electromagnetic wave are different. The composite modulation is obtained through equation (4), the index e and the index r hereinafter indicating the link to the transmission and to the reception, respectively:

$$I_e(\Theta)I_r(\Theta) = 16\rho^2 \sin^2\left(\frac{2\pi h_{1e} h_2}{\lambda d}\right)\sin^2\left(\frac{2\pi h_{1r} h_2}{\lambda d}\right)$$

By taking the square root of the amplitude of the received signal, the temporal modulation function $x_i$ is obtained:

$$x_i = K|\sin(2\pi f_e i \Delta T + \varphi_{e0})||\sin(2\pi f_r i \Delta T + \varphi_{r0})|$$

Using the same notations as previously:

$$f_e = \frac{h_{1e} h_2 V}{\lambda d_0^2}$$

$$f_r = \frac{h_{1r} h_2 V}{\lambda d_0^2}$$

$$\varphi_{0e} = \frac{2\pi h_{1e} h_2}{\lambda d_0} = \frac{2\pi f_e d_0}{V}$$

$$\varphi_{0r} = \frac{2\pi h_{1r} h_2}{\lambda d_0} = \frac{2\pi f_r d_0}{V}$$

The sampled measurements of the temporal modulation are still carried out at reception 61.

It is possible to use a correlation function to estimate the modulation frequencies on transmission $f_e$ and on reception $f_r$, for example by applying:

$$s_{i,k,k'} = \left|\sin\left(2\pi \frac{ikF\max}{M} + \varphi_{k'}\right)\right|$$

for k ranging from 0 to M−1 and k' ranging from 0 to M'−1; and:

$$s_{i,l,l'} = \left|\sin\left(2\pi \frac{ilF\max}{M} + \varphi_{l'}\right)\right|$$

for l ranging from 0 to M−1 and l' ranging from 0 to M'−1.

The correlation function is calculated:

$$\text{Correl}_{k,k',l,l'} = \frac{\sum_{i=0}^{N-1} x_i * s_{i,k,k'} * s_{i,l,l'}}{\sqrt{\sum_{i=0}^{N-1} x_i^2} \sqrt{\sum_{k=0}^{N-1} s_{i,k,k'}^2} \sqrt{\sum_{l=0}^{N-1} s_{i,l,l'}^2}}$$

The values of k,k',l,l', for which the function $\text{Correl}_{k,k',l,l'}$ exhibits a maximum, give an estimation of the modulation frequencies:

$$\hat{f}_e = \frac{kF\max}{M} \text{ and } \hat{f}_r = \frac{lF\max}{M'}$$

which correspond to two estimations of the height $h_2$, which may be averaged.

The estimation principles described above may be applied in general to all of the possible combinations of pairs of transmission and reception sub-arrays of one and the same antenna.

Figure 7:
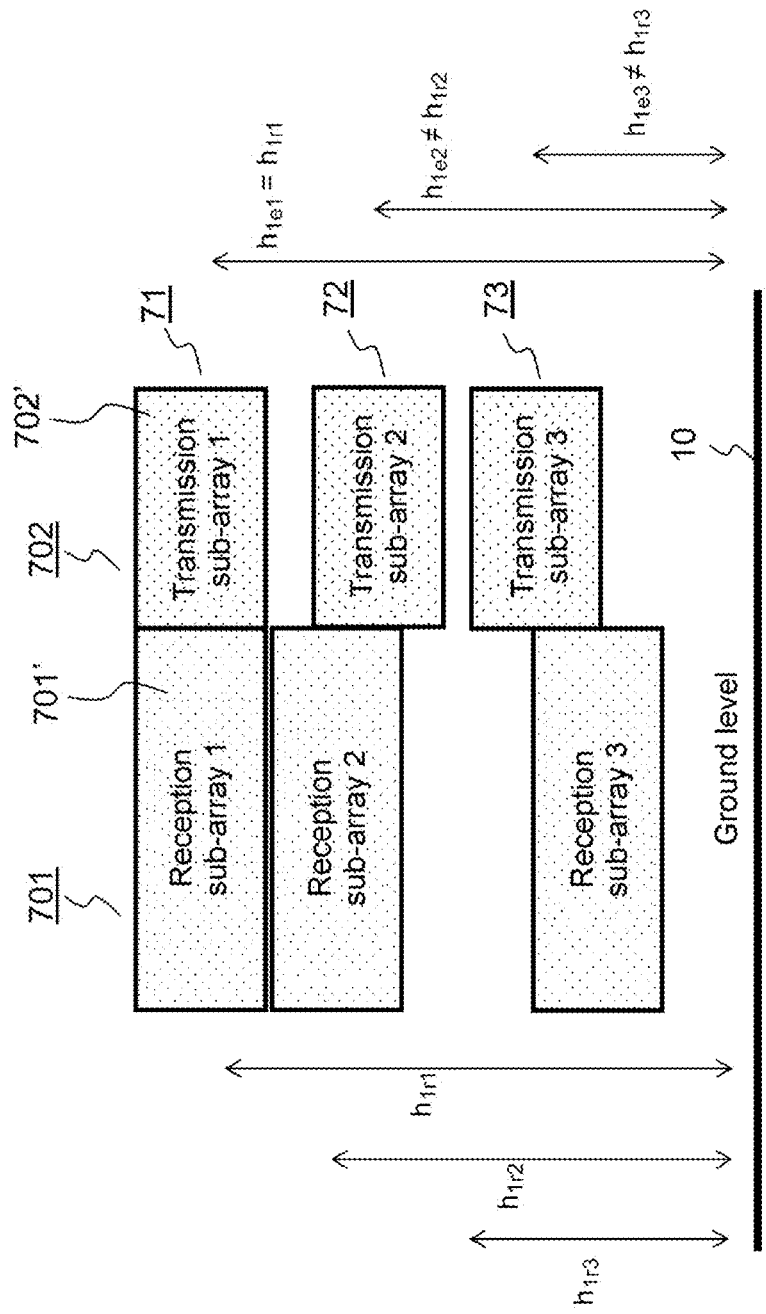
FIG. 7 shows an antenna configuration of the type shown in FIG. 5, with transmission and reception antenna arrays, but with different transmission and reception sub-array heights.

FIG. 7 shows an antenna configuration of the type in FIG. 5, with transmission 702 and reception 701 antenna arrays, but with different transmission and reception sub-array heights. More precisely, the transmission sub-arrays and the reception sub-arrays are not all arranged at the same height. In particular, the sub-arrays of the pairs 72, 73 do not have the same transmission and reception height.

As in the example of FIG. 5, the configuration of FIG. 7 makes it possible to obtain nine combinations of pairs, giving nine different estimations of $h_2$, which may be averaged in order to refine the measurement even more precisely. These different estimations are useful for making the measurements reliable, in particular when the roadway is not flat, with imperfections in the roadway then being able to introduce biases into the calculations.

Having described a dynamic measurement of the time-dependent modulation function (temporal modulation measurement), a measurement of the instantaneous amplitude modulation on the antenna (spatial modulation measurement) will now be described, which measurement may advantageously be combined with the dynamic measurement.

This static measurement requires a plurality of reception and transmission sub-array positions on one and the same antenna that are arranged along a vertical axis.

It is possible to use Q reception antenna sub-arrays whose phase centres are spaced apart on the vertical axis, and at least one transmission sub-array, according to the configuration of FIG. 5 or 7, for example. The sub-arrays positioned at different heights may also be offset on the horizontal axis, such as for example in FIG. 7.

Generally, the amplitude modulation for the transmission sub-array positioned at the height $h_{1ep}$ and the reception sub-array positioned at the height $h_{1rq}$, at the distance d from the target, is written as:

$$I_{ep}(\ominus)I_{rq}(\ominus) = 16\rho^2 \sin^2\left(\frac{2\pi h_{1ep}h_2}{\lambda d}\right)\sin^2\left(\frac{2\pi h_{1rq}h_2}{\lambda d}\right)$$

At a given instant and for a given height $h_{iep}$ of the transmission antenna sub-array with index p, the amplitude of the signal received on the antenna sub-array with index q, positioned at the height of height $h_{1rq}$, is proportional to:

$$\sin^2\left(\frac{2\pi h_{1rq}h_2}{\lambda d}\right)$$

It is possible, for example, to calculate the square root of the amplitude of the received signal, to deduce therefrom a signal:

$$y_{p,q} = K_p\left|\sin\left(\frac{2\pi h_{1rq}h_2}{\lambda d}\right)\right|$$

where $K_p$ is a constant dependent on the height of the transmission sub-array of rank p.

By repeating the operation on the Q height positions of the reception sub-arrays, a series of Q values of $y_{p,q}$ is obtained, on the basis of which it is possible to estimate $h_2$, in accordance with the principles described in particular in the patent applications FR 2 913 774 and FR 2 901 613.

Figure 8:
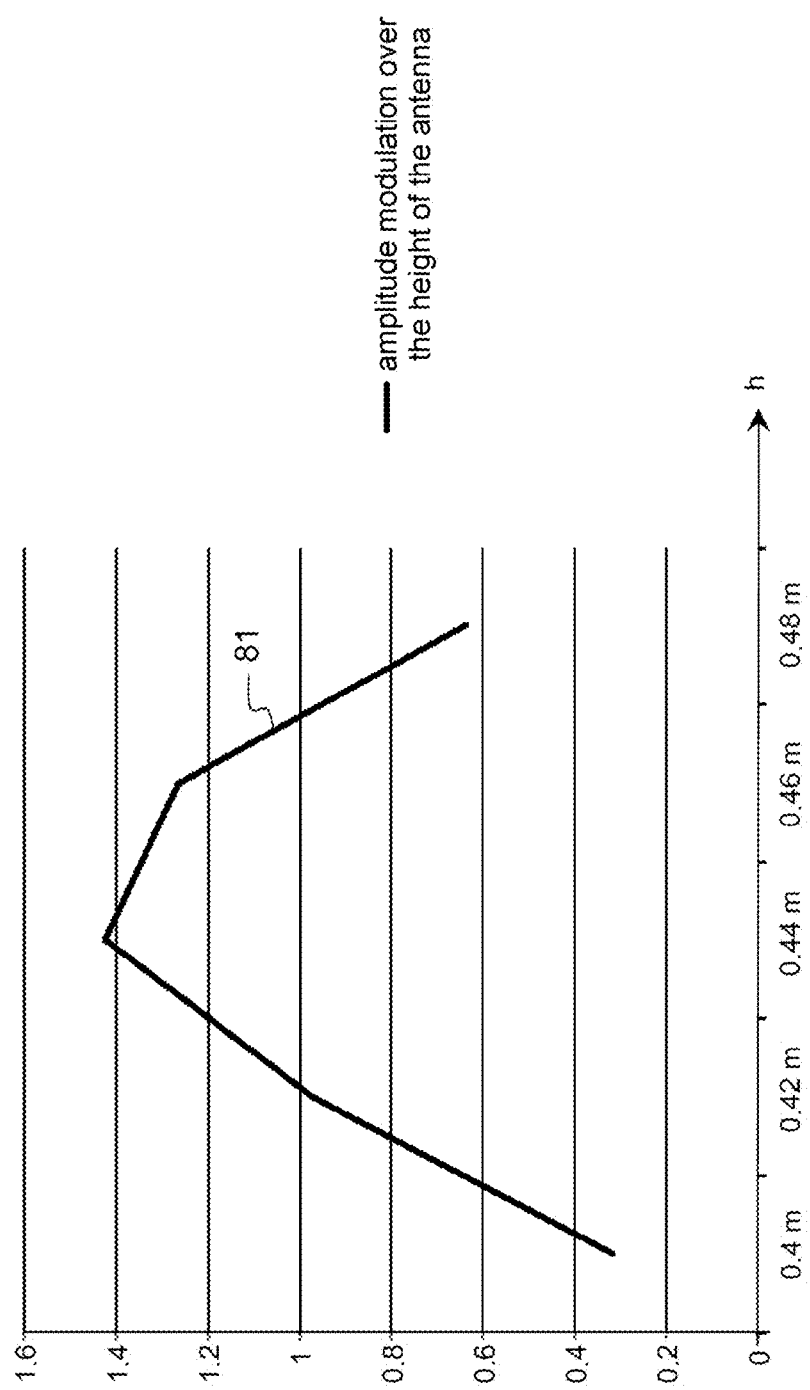
FIG. 8 shows the trend of the spatial modulation function on the reception antenna array formed of regularly spaced-apart reception sub-arrays.

FIG. 8 shows, through a curve 81, the trend of the corresponding modulation function on an antenna formed of five reception sub-arrays spread apart from one another by 2 cm, the lowest being 40 cm above the ground, for a target positioned at 4.60 m, at a distance of 300 m. The curve 81 shows the modulation along the antenna depending on the height, starting from the lowest height, 40 cm. The modulation 81 describes a portion of the absolute value of the sinusoid. On the basis of this sinusoid portion, it is known how to measure the frequency of the modulation, as will be described hereinafter.

By denoting the height difference between the reception sub-array of rank q and the lowest reception sub-array: $\Delta h_{1rq}=h_{1rq}-h_{1r0}$, a modulation function is obtained:

$$y_{p,q} = K_p\left|\sin\left(\frac{2\pi \Delta h_{1rq}h_2}{\lambda d} + \frac{2\pi h_{1r0}h_2}{\lambda d}\right)\right|$$

By preferably selecting a regular spacing between the reception sub-arrays, the height of the sub-arrays evolves in accordance with the following arithmetic progression:

$$h_{1rq} = h_{1r0} + q\Delta h_1$$

and:

$$y_{p,q} = K_p\left|\sin\left(\frac{2\pi h_2 q\Delta h_1}{\lambda d} + \frac{2\pi h_{1r0}h_2}{\lambda d}\right)\right|$$

This equation may be written as follows:

$$y_{p,q} = K_p|\sin(2\pi f_s q\Delta h_1 + \varphi_{s0})|$$

with:

$$f_s = \frac{h_2}{\lambda d}$$

and $$\varphi_{s0} = \frac{2\pi h_{1r0}h_2}{\lambda d} = 2\pi h_{1r0}f_s$$

The frequency space is discretized into R possible values between 0 and $F_{smax}$ such that, for r ranging from 0 to R−1:

$$f_s = r\frac{Fsmax}{R},$$

and the phase space is discretized into R" possible values, for r' ranging from 0 to R'−1, such that:

$$\psi_{r'} = r'\frac{2\pi}{R'}$$

then we apply:

$$u_{p,q,r,r'} = \left|\sin\left(2\pi\frac{qrF_{smax}\Delta h_1}{R} + \psi_{r'}\right)\right|$$

The correlation function is then calculated:

$$\text{Correl}_{p,q,r,r'} = \frac{\sum_{q=0}^{Q-1} y_{p,q} * u_{p,q,r,r'}}{\sqrt{\sum_{q=0}^{Q-1} y_{p,q}^2}\sqrt{\sum_{q=0}^{Q-1} u_{p,q,r,r'}^2}}$$

The values of r and r', for which the function $\text{Correl}_{p,q,r,r'}$ exhibits a maximum, give an estimation of the modulation frequency:

$$\hat{f}_s = r\frac{F_{smax}}{R}$$

from which the sought height $h_2$ is deduced:

$$h_2 = \hat{f}_s\lambda d$$

In a symmetrical manner, it is also possible to use a plurality of transmission sub-arrays positioned at different heights, these sub-arrays transmitting orthogonal waves, in order to observe the resultant modulation on a given reception sub-array, and to deduce the height of the target therefrom.

Finally, it is possible to combine a plurality of transmission sub-arrays and a plurality of reception sub-arrays in order to refine the estimation.

In summary, it is possible to measure the instantaneous (spatial) amplitude modulation on the antenna at a given instant:

on a plurality of reception antenna sub-arrays positioned at different heights, for a single transmission antenna;

or on a single reception antenna, for a plurality of transmission antenna sub-array positions positioned at different heights;

or on a plurality of reception antenna sub-arrays positioned at different heights, for a plurality of transmission antenna sub-array positions positioned at different heights.

In one advantageous mode of implementation of the invention, it is possible to combine the utilization of the spatial modulation measurement with the utilization of the temporal measurement. It is thus possible to boost the quality of the estimation of the height. This combination may be implemented for example by using a spatio-temporal autocorrelation function using both the spatial sampling diversity on the antenna sub-arrays and the temporal sampling diversity. An example is described below.

For simplicity of writing, we restrict ourselves, as above, to the case where the transmission is performed from a sub-array positioned at the height $h_{1ep}$, and we consider Q reception antenna sub-arrays whose phase centres are spaced apart regularly on the vertical axis by an interval $\Delta h_1$, such that the reception sub-array of rank q is positioned at the height $h_{1rq} = h_{1r0} + q\Delta h_1$.

At the instant $t = i\Delta T$, the amplitude of the modulation signal on the sub-array of rank q may be written as:

$$y_{p,i,q} = K_p \left| \sin\left( \frac{2\pi h_2 (h_{1r0} + q\Delta h_1)}{\lambda d_i} \right) \right|$$

with:

$$\frac{1}{d_i} = \frac{1}{d_0 - Vi\Delta T} \approx \frac{1}{d_0}\left(1 + \frac{Vi\Delta T}{d_0}\right)$$

We write:

$$y_{p,i,q} = K_p \left| \sin\left( \frac{2\pi h_2(h_{1r0} + q\Delta h_1)}{\lambda d_0} \right)\left(1 + \frac{Vi\Delta T}{d_0}\right) \right|$$

By applying, as previously:

$$f = \frac{h_{1r0} h_2 V}{\lambda d_0^2} \text{ and } \varphi_0 = \frac{2\pi f d_0}{V} = \frac{2\pi h_{1r0} h_2}{\lambda d_0}$$

the spatio-temporal modulation signal may be written as:

$$y_{p,i,q} = K_p \left| \sin\left( 2\pi f\left(1 + \frac{q\Delta h_1}{h_{1r0}}\right)i\Delta T + \varphi_0\left(1 + \frac{q\Delta h_1}{h_{1r0}}\right) \right) \right|$$

Figure 9:
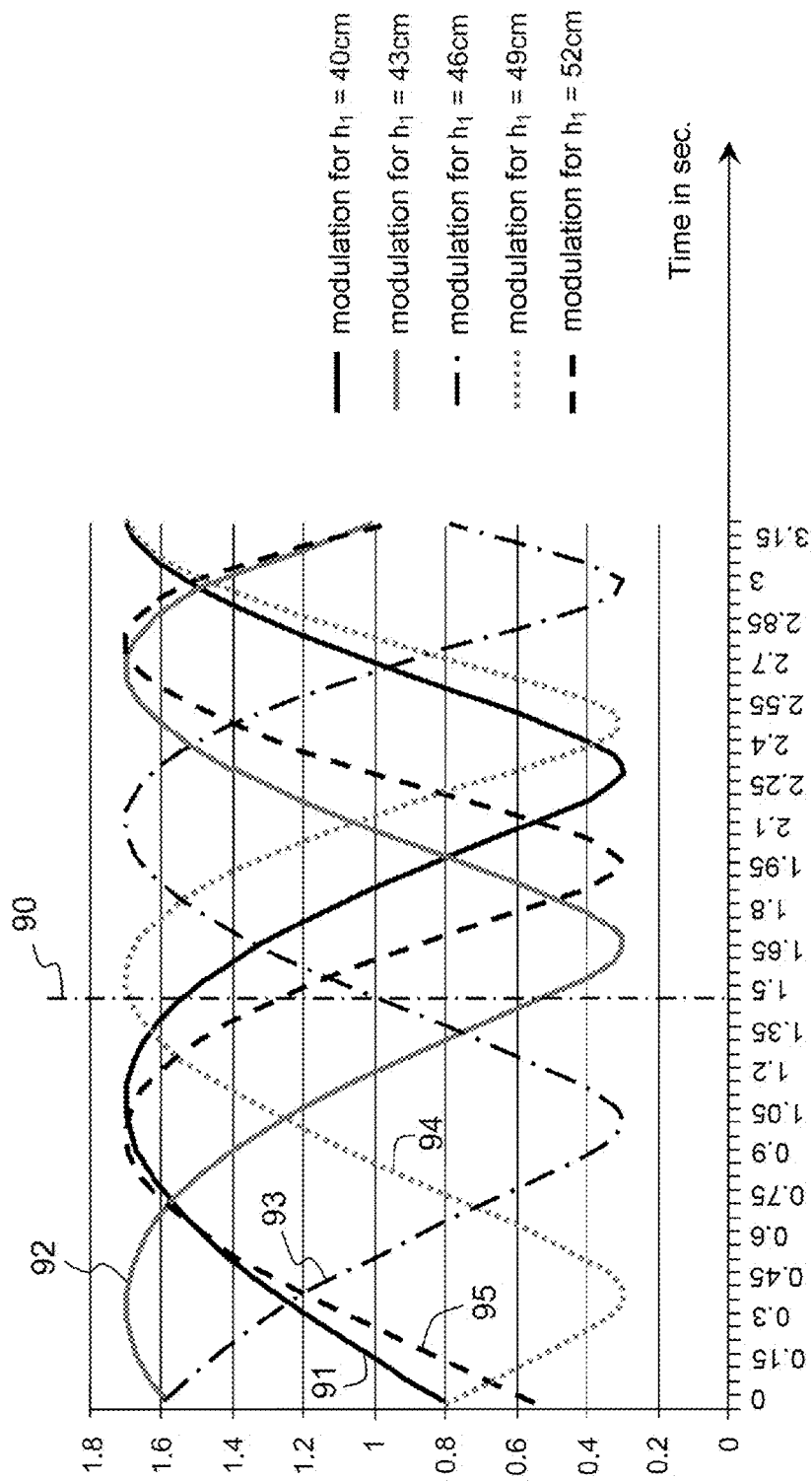
FIG. 9 shows the theoretical trend of the temporal modulations observed over time in the case of regularly spaced-apart reception sub-arrays.

FIG. 9 shows the theoretical trend of the temporal modulations observed over time in the case of five reception sub-arrays spaced apart regularly by 3 cm in the vertical plane, for an initial distance of 300 m, a closing speed of 100 km/h, a coefficient of reflection of 0.7 and a target height of 4.6 m.

Five curves 91, 92, 93, 94, 95 show the time-dependent temporal modulations on the sub-arrays of respective heights 40 cm, 43 cm, 46 cm, 49 cm and 52 cm. A spatial modulation at a given instant is obtained by sampling the amplitude values at this instant. This spatial modulation is illustrated in FIG. 9 by the intersection of the straight line 90 with the curves, the intersections corresponding to the sampled values. More generally, any vertical section makes it possible to obtain a spatial modulation at the corresponding instant. FIG. 9 thus illustrates the variety of the sampling enabled by this solution.

To extract the modulation frequency, giving access to the height $h_2$, it is possible to use a two-dimensional correlation function, with a temporal dimension and a spatial dimension.

To this end, the temporal frequency space is discretized into M possible values between 0 and $F_{max}$, such that:
for k ranging from 0 to M−1, $$f_k = k\frac{F\max}{M}$$

and the spatial phase space is discretized into M' possible values between 0 and $2\pi/M'$, such that
for k ranging from 0 to M−1, $$\varphi'_k = k'\frac{2\pi}{M'}$$

we denote:

$$w_{i,q,k,k'} = \left| \sin\left( 2\pi \frac{ikF\max\left(1 + \frac{q\Delta h_1}{h_{1r0}}\right)\Delta T}{M} + \varphi'_k\left(1 + \frac{q\Delta h_1}{h_{1r0}}\right) \right) \right|$$

And the two-dimensional correlation function is then calculated:

$$\text{Correl}_{k,k'} = \frac{\sum_{q=0}^{Q-1}\sum_{i=0}^{N-1} y_{p,i,q} * w_{i,q,k,k'}}{\sqrt{\sum_{q=0}^{Q-1}\sum_{i=0}^{N-1} y_{p,i,q}^2} \sqrt{\sum_{q=0}^{Q-1}\sum_{k=0}^{N-1} w_{i,q,k,k'}^2}}$$

The values of k and k', for which the function $\text{Correl}_{k,k'}$ exhibits a maximum, give an estimation of the modulation frequency:

$$\hat{f} = f_k = \frac{kF\max}{M}$$

from which we deduce $$h_2 = \frac{\lambda d_0^2 \hat{f}}{h_1 V}.$$

It is also possible to estimate the height $h_2$ on the basis of the dynamic (temporal modulation) and static (spatial modulation) estimations described previously, and to carry out a weighted or unweighted averaging of the two estimations obtained.

The invention advantageously makes it possible to obtain sufficient discrimination without increasing the dimensions of the radar antenna. It makes it possible in particular, at long distance, to draw a clear distinction between a bridge deck and one or more stationary vehicles on the roadway. It may be applied to objects that are punctiform or that extend along the vertical axis. It does not increase the bulk of the electronics or the complexity of the radar, and it is easy to apply.

The estimation of the height may advantageously be combined with other discriminating parameters, such as the estimated equivalent surface, the distance, the distance span, the estimated lateral position, and fluctuations in all of these, in order to deduce therefrom a signature making it possible to characterize the nature of the detected object.

The invention applies to measuring the actual height of objects located on the ground, such as a bridge deck, for example. As was indicated previously, it also applies to height measurements of continuous objects located on the ground. In this case, the target height $h_2$ corresponds to the apparent height of the average bright spot.

The invention has been described for measuring the height of a fixed target, for example a bridge. It may apply, however, to moving objects, and advantageously make it possible to classify vehicles, for example, by detecting the height of the vehicles. In this case, the closing speed V of the radar towards the target (another vehicle for example) is ultimately the relative speed of the radar relative to this target.

The invention claimed is:

1. A method for measuring a height of a target relative to the ground comprising: using a moving radar transmitting a detection signal towards said target, equipping said radar with a transmission antenna array and with a reception antenna array that produces at least one time-dependent amplitude modulation, obtaining a measurement of a target height ($h_2$) by estimating a frequency of the at least one time-dependent amplitude modulation produced on said reception antenna array, and generating said at least one time-dependent amplitude modulation by interference of signals received directly from said target and signals received after reflection on the ground, on a basis of signals transmitted by said transmission antenna array.

2. The method according to claim 1, wherein the measurement of said target height ($h_2$) is obtained, for a given time-dependent modulation, by applying the following equation:

$$h_2 = \frac{\lambda d_0^2 \hat{f}}{h_1 V}$$

$h_2$ being an said estimated height;
$\hat{f}$ being the estimated frequency of a time-dependent amplitude modulation;
$h_1$ being the height at which said detection signal is transmitted;
$d_0$ being a distance from said radar to the target;
V being a closing speed of said radar towards the target; and
$\lambda$ being a wavelength of said radar.

3. The method according to claim 1, wherein said reception antenna array being formed of one or more reception sub-arrays and said transmission antenna array being formed of one or more transmission sub-arrays, each signal transmitted by a transmission sub-array generating a time-dependent amplitude modulation on each reception sub-array, a measurement of said target height ($h_2$) is carried out by estimating a frequency of the time-dependent amplitude modulation produced on a reception sub-array by a transmission sub-array situated at the same height.

4. The method according to claim 3, wherein the estimation ($\hat{f}$) of a modulation frequency is carried out using a suitable two-dimensional correlation function, taking account of the frequency and a phase at an origin of said modulation, the estimation of the frequency being equal to a frequency $f_k$ of the frequency-phase pair ($f_k$, $\varphi_k$) giving the correlation maximum.

5. The method according to claim 1, wherein, said reception antenna array being formed of one or more reception sub-arrays and said transmission antenna array being formed of one or more transmission sub-arrays, each signal transmitted by a transmission sub-array generating a time-dependent amplitude modulation on each reception sub-array, a measurement of said target height ($h_2$) is carried out by estimating the frequency of the time-dependent amplitude modulation produced on a reception sub-array by a transmission sub-array situated at a different height, said modulation being a product of a modulation corresponding to an outbound path and a modulation corresponding to a return path of the wave transmitted by said transmission sub-array, a measurement of said height being the estimation $\hat{f}_e$ of a modulation frequency due to the outbound path or the estimation $\hat{f}_r$ of the modulation frequency due to the return path.

6. The method according to claim 5, wherein said measurement is taken to be equal to a combination of the estimation $\hat{f}_e$ of the modulation frequency due to the outbound path and of the estimation $\hat{f}_r$ of the modulation frequency due to the return path.

7. The method according to claim 6, wherein said combination averages the two estimations $\hat{f}_e$ and $\hat{f}_r$.

8. The method according to claim 5, wherein the estimation of modulation frequencies, due to the outbound path and to the return path, is carried out using a correlation function taking account of the modulation frequency due to the outbound path and the modulation frequency due to the return path, said estimated frequencies $\hat{f}_e$, $\hat{f}_r$ being those giving the correlation maximum.

9. The method according to claim 1, wherein said frequency estimation with which said height measurement is obtained is a combination of time-dependent amplitude modulation frequency estimations obtained for various pairs of transmission and reception sub-arrays.

10. The method according to claim 1, wherein, said reception antenna array including a plurality of reception sub-arrays, each reception sub-array receiving at least one interference signal originating from a signal transmitted by said transmission antenna array, said interference signal being subjected to time-dependent amplitude modulation:
  a trend of at least one amplitude modulation produced along said reception antenna array at a given instant depending on the height of said sub-arrays is captured; and
  an estimation $\hat{f}$ of the time-dependent amplitude modulation frequency is calculated by means of a spatio-temporal correlation function taking account of the time-dependent amplitude modulation frequency and the frequency of at least one spatial amplitude modulation, a frequency $f_k$ corresponding to the correlation maximum of said spatio-temporal correlation being the estimated frequency $\hat{f}$, the measurement of said target height being calculated on a basis of this estimated frequency.

11. The method according to claim 10, wherein, said transmission antenna array including a plurality of transmission sub-arrays, the trend of the spatial amplitude modulation produced on said reception antenna array corresponding to each signal transmitted by a transmission sub-array is captured, an estimation $\hat{f}$ of the time-dependent amplitude modulation frequency is calculated for each transmitted signal by means of a spatio-temporal correlation function taking account of the time-dependent amplitude modulation frequency and the frequency of said at least one spatial amplitude modulation, the frequency $f_k$ corresponding to the correlation maximum of said spatio-temporal correlation being the estimated frequency $\hat{f}$ of the time-dependent amplitude modulation generated by said transmitted signal, a measurement of said target height ($h_2$) being calculated on a basis of at least one estimated frequency corresponding to a signal transmitted from said transmission sub-arrays.

12. The method according to claim 11, wherein the measurement of said target height ($h_2$) is a combination of the height measurements corresponding to each transmitted signal.

13. The method according to claim 12, wherein said combination is an average.

14. The method according to claim 1, wherein said target is a bridge deck.

15. The method according to claim 1, wherein said target height ($h_2$) corresponds to an apparent height of an average bright spot of a continuous object located on the ground.

16. A Radar comprising: a moving radar tramsmitting a detection signal towards said target, a transmission antenna array, a reception antenna array configured to produce at least one time-dependent amplitude modulation, the moving radar configured to obtain a measurement of a target height ($h_2$) by estimating a frequency of the at least one time-dependent amplitude modulation produced on said reception antenna array, and the radar configured to generate said at least one time-dependent amplitude modulation by interference of signals received directly form said target and signals received after reflection on the ground, on a basis of signals transmitted by said transmission antenna array.

17. The radar according to claim 16, wherein the radar is implemented on a motor vehicle.

18. The radar according to claim 16, wherein the measurement of said target height ($h_2$) is obtained, for a given time-dependent modulation, by applying the following equation:

$$h_2 = \frac{\lambda d_0^2 \hat{f}}{h_1 V}$$

$h_2$ being an estimated height;
$\hat{f}$ being the estimated frequency of a time-dependent amplitude modulation;
$h_1$ being the height at which said detection signal is transmitted;
$d_0$ being a distance from said radar to the target;
V being a closing speed of said radar towards the target; and
$\lambda$ being a wavelength of said radar.

19. The radar according to claim 16, wherein said reception antenna array being formed of one or more reception sub-arrays and said transmission antenna array being formed of one or more transmission sub-arrays, each signal transmitted by a transmission sub-array generating a time-dependent amplitude modulation on each reception sub-array, a measurement of said target height ($h_2$) is carried out by estimating a frequency of the time-dependent amplitude modulation produced on a reception sub-array by a transmission sub-array situated at the same height.

20. The radar according to claim 19, wherein the estimation ($\hat{f}$) of a modulation frequency is carried out using a suitable two-dimensional correlation function, taking account of the frequency and a phase at an origin of said modulation, the estimation of the frequency being equal to a frequency $f_k$ of the frequency-phase pair ($f_k$, $\varphi_k$) giving the correlation maximum.

* * * * *